United States Patent
Tang et al.

(10) Patent No.: US 12,422,309 B2
(45) Date of Patent: Sep. 23, 2025

(54) ACCURATE TEMPERATURE MEASUREMENT STRUCTURE OF WIDE TEMPERATURE RANGE AND METHOD THEREOF

(71) Applicant: NATIONAL CHUNG SHAN INSTITUTE OF SCIENCE AND TECHNOLOGY, Taoyuan (TW)

(72) Inventors: Shiang-Feng Tang, Taoyuan (TW); Shun-Lung Yen, Taoyuan (TW); Kuo-Jen Chang, Taoyuan (TW); Hsin-Chang Chen, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 353 days.

(21) Appl. No.: 18/333,566

(22) Filed: Jun. 13, 2023

(65) Prior Publication Data
US 2024/0418578 A1     Dec. 19, 2024

(51) Int. Cl.
| | |
|---|---|
| *G01K 11/00* | (2006.01) |
| *G01K 1/022* | (2021.01) |
| *G01K 15/00* | (2006.01) |

(52) U.S. Cl.
CPC .............. *G01K 11/00* (2013.01); *G01K 1/022* (2013.01); *G01K 15/005* (2013.01)

(58) Field of Classification Search
CPC ......... G01K 1/00; G01K 11/00; G01K 15/005
USPC .............................................. 374/130; 702/99
See application file for complete search history.

(56) References Cited

U.S. PATENT DOCUMENTS

| | | | |
|---|---|---|---|
| 10,848,625 B1* | 11/2020 | Pugh ................... | H04N 1/00027 |
| 2003/0030011 A1* | 2/2003 | Brown et al. ............ | G05B 1/00 |
| | | | 250/455.11 |
| 2013/0051428 A1* | 2/2013 | Wang ..................... | G01K 13/00 |
| 2020/0050073 A1* | 2/2020 | Ikeda et al. ............. | G02F 1/163 |
| 2020/0174353 A1* | 6/2020 | Gunwald et al. .... | G03B 21/204 |
| 2021/0140830 A1* | 5/2021 | Zhao et al. ........... | G01J 5/0825 |
| 2022/0324026 A1* | 10/2022 | Becket et al. .......... | B22F 10/31 |
| 2025/0102423 A1* | 3/2025 | Petisce et al. ....... | G01N 21/278 |

OTHER PUBLICATIONS

Lee et al., "Novel Performance Evaluation of Thermal Camera Based on VOx Bolometer Focal Plane Array via Analysis of Sigma NETD, Mean NETD, and Roughness Index", Sensor and Material, vol. 30, No. 6, pp. 1283-1296 (Year: 2018).*

* cited by examiner

Primary Examiner — John E Breene

(57) ABSTRACT

An accurate temperature measurement structure of a wide temperature range includes: a lens set; an optical base, having a neutral density slot and being fixed with the lens set by a first screw; a mask shutter assembly, fixed with the optical base by a second screw; and a temperature sensing unit, for sensing a target object temperature so as to obtain a measured temperature value, the temperature sensing unit performing a temperature normalization correction when the accurate temperature measurement structure of the wide temperature range is in a power-on stage to obtain a signal strength value, setting a plurality of signal conditions according to the signal strength value to obtain a dynamic linearity strength value and accordingly determining an extreme value region, so as to determine whether to add a neutral density filter to the neutral density slot.

10 Claims, 3 Drawing Sheets

ACCURATE TEMPERATURE MEASUREMENT STRUCTURE OF WIDE TEMPERATURE RANGE AND METHOD THEREOF

BACKGROUND OF THE INVENTION

1. Field of the Invention

The present disclosure relates to a temperature measurement structure and method, and in particular to an accurate temperature measurement structure of a wide temperature range and a method thereof.

2. Description of the Related Art

When a conventional temperature measurement device is used to measure a target temperature, in order to satisfy temperature measurement of a wide temperature range, a sensor in the temperature measurement device needs to have a high linearity in response to temperature, hence maintaining temperature measurement stability and precision in a wide temperature range and minimizing variances in the measured temperature. Due to the limitation above, the temperature measurement design of almost all temperature measurement devices is directed toward a mainstream trend, that is, slope correction of multiple divided linear regions, so as to meet the linearity in response to a wide temperature range to further achieve accurate temperature measurement and temperature precision. However, there are related limitations. If the temperature measurement range is too wide, usually in two sections from room temperature (R.T) to 200° C. and 200° C. to 500° C., the linearities may be corrected by a segmented linear mathematic curve so as to meet the linearity in response to the wide temperature range, achieving certain temperature measurement precision. However, once the temperature goes beyond 500° C., signal output gain values in firmware of temperature measurement devices need to be adjusted by device manufacturers, for example, signal output gain values need to be reduced. However, when a high-temperature target object is measured, measurement signals may become saturated, and the temperature measurement precision is degraded at the same time. Therefore, almost all manufacturers of temperature measurement devices, within test intervals of an extremely wide temperature range, manufacture temperature measurement devices suitable for different temperature intervals with respective correction parameter optimization, so as to satisfy temperature measurement requirements for different temperature intervals. This is primarily aimed to maintain the accuracy and linearity of temperatures measured within a corresponding temperature measurement range. In addition, while signal output gain values are adjusted, overly large variances in the measured temperatures caused by reduced temperature measurement response of the temperature measurement devices (reduced sensitivity of the temperature measurement devices) also need to be prevented.

BRIEF SUMMARY OF THE INVENTION

In view of the drawbacks of the prior art above, the present disclosure provides an accurate temperature measurement structure of a wide temperature range and a method thereof to overcome these drawbacks.

To achieve the object above, an accurate temperature measurement structure of a wide temperature range provided according to the present disclosure includes: a lens set, having a first connecting member; an optical base, having a first coupling member, a second connecting member and a neutral density slot, wherein the neutral density slot is located on a plane perpendicular to an optical axis, the lens set is connected to the first coupling member of the optical base by the first connecting member, and the lens set is fixed with the optical base by a first screw; a mask shutter assembly, having a second coupling member, wherein the optical base is connected to the second coupling member of the mask shutter assembly by the second connecting member, and the mask shutter assembly is fixed with the optical base by a second screw; and a temperature sensing unit, disposed in the optical base and used for sensing a target object temperature to obtain a measured temperature value, the temperature sensing unit performing a temperature normalization correction when the accurate temperature measurement structure of a wide temperature range is in a power-on stage to obtain a signal strength value, setting a plurality of signal conditions according to the signal strength value to obtain a dynamic linearity strength value, and determining an extreme value region according to the dynamic linearity strength value, wherein a neutral density filter is added to the neutral density slot upon determining that the dynamic linearity signal strength value is greater than the extreme value region.

In the accurate temperature measurement structure of the wide temperature range of the present disclosure, the extreme value region has a predetermined clamping value, and the extreme value region determines whether the dynamic linearity strength value is greater than the predetermined clamping value. When the dynamic linearity strength value is greater than the predetermined clamping value, the neutral density filter is added to the neutral density slot; when the dynamic linearity strength value is less than the predetermined clamping value, the neutral density filter is not added to the neutral density slot.

In the accurate temperature measurement structure of the wide temperature range of the present disclosure, the neutral density filter is fixed in the neutral density slot by a third screw.

In the accurate temperature measurement structure of the wide temperature range of the present disclosure, a neutral density filter having a most appropriate attenuation intensity percentage is selected as the neutral density filter according to a temperature measurement section and placed in parallel into the neutral density slot.

In the accurate temperature measurement structure of the wide temperature range of the present disclosure, the mask shutter assembly includes an electrically controlled motor.

An accurate temperature measurement method of a wide temperature range of the present disclosure, performed by the foregoing accurate temperature measurement structure of the wide temperature range, includes: when the accurate temperature measurement structure of the wide temperature range is in a power-on stage, performing a temperature normalization correction to obtain a signal strength value; setting a plurality of signal conditions for the signal strength value to obtain a dynamic linearity strength value; determining an extreme value region for the dynamic linearity strength value, adding the neutral density filter to the neutral density slot when the dynamic linearity strength value is greater than a predetermined clamping value, and not adding the neutral density filter to the neutral density slot when the dynamic linearity strength value is less than the predetermined clamping value; automatically storing a value of the dynamic linearity strength value calculated from multiple times of iteration to an interval temperature look-up table;

and performing a high-low temperature inverse operation to obtain a measured temperature value.

In the accurate temperature measurement method of the wide temperature range of the present disclosure, the setting of the plurality of signal conditions performs dynamic linearity calculation of a signal gain value and a signal integration time for the signal strength value to obtain the dynamic linearity strength value.

In the accurate temperature measurement method of the wide temperature of the present disclosure, a neutral density filter having a most appropriate attenuation intensity percentage is selected as the neutral density filter according to a temperature measurement section and placed in parallel into the neutral density slot.

In the accurate temperature measurement method of the wide temperature range of the present disclosure, the neutral density filter is fixed in the neutral density slot by a third screw.

In the accurate temperature measurement method of the wide temperature range of the present disclosure, a neutral density filter having a most appropriate attenuation intensity percentage is selected as the neutral density filter according to a temperature measurement section and placed in parallel into the neutral density slot.

In the single accurate temperature measurement structure of the wide temperature range of the present disclosure, optical neutral density filters having different attenuation intensity percentages are replaced and placed into the optical neutral density slot. Thus, without needing to purchase additional temperature measurement devices for different measurement temperature ranges or replacing optical lenses of temperature measurement devices, linearity in response signals in a wide temperature range can be maintained, achieving high temperature measurement accuracy for a wide temperature range.

DETAILED DESCRIPTION OF THE INVENTION

Implementation details of the present disclosure are described by way of specific embodiments for a person skilled in the art to understand other advantages and effects of the present disclosure on the basis of the disclosure of the present application.

Figure 1:
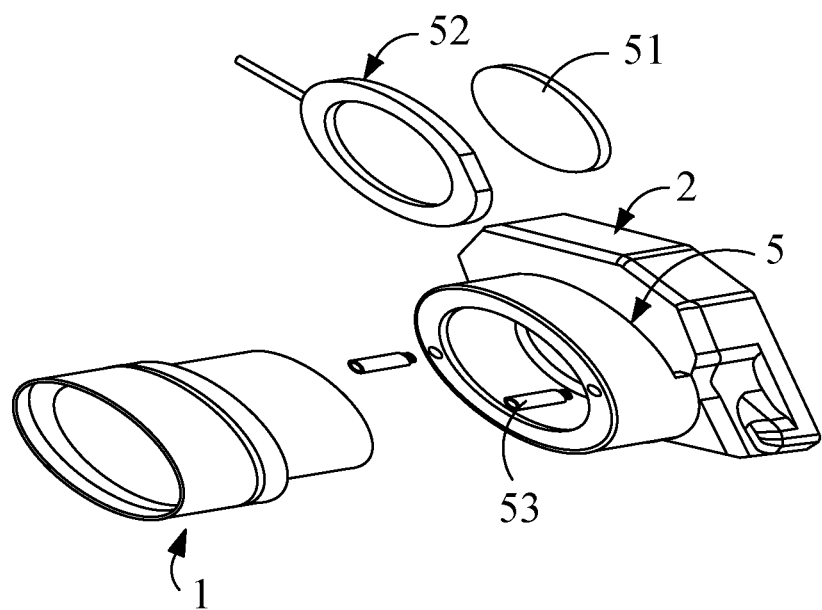
FIG. 1 is a partially exploded schematic diagram of an accurate temperature measurement structure of a wide temperature range according to an embodiment of the present disclosure.
Figure 2:
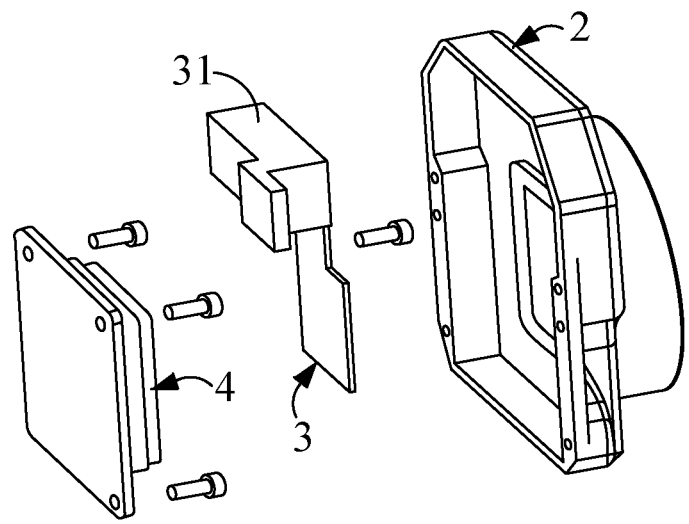
FIG. 2 is a partially exploded schematic diagram of the accurate temperature measurement structure of the wide temperature range according to the embodiment of the present disclosure.

Referring to FIG. 1 and FIG. 2 showing schematic diagrams of an accurate temperature measurement structure of a wide temperature range of the present disclosure, the accurate temperature measurement structure of the wide temperature range includes a lens set 1, an optical base 2, a mask shutter assembly 3 and a temperature sensing unit 4. The lens set 1 has a first connecting member. The optical base 2 has a first coupling member and a second connecting member. The lens set 1 is connected to the first coupling member of the optical base 2 by the first connecting member, and the lens set 1 is fixed with the optical base 2 by a first screw (not shown). The mask shutter assembly 3 has a second coupling member. The optical base 2 is connected to the second coupling member of the mask shutter assembly 3 by the second connecting member, and the mask shutter assembly 3 is fixed with the optical base 2 by a second screw (not shown). The mask shutter assembly 3 has an electrically controlled motor 31, which is for driving the mask shutter assembly 3 to correct uniformity of thermal images under different background environments at all times. The temperature sensing unit 4 is disposed in the optical base 2 and includes a thermal image temperature sensor and a signal processor. The thermal image temperature sensor is for sensing a target object temperature. The thermal image temperature sensor is, for example, a thermal imager temperature sensor.

In this embodiment, the optical base 2 has a neutral density slot 5. The neutral density slot 5 is located on a plane perpendicular to an optical axis. The neutral density slot 5 is for disposing a neutral density filter 51 and a neutral density filter fixing frame 52. The neutral density filter 51 is fixed in the neutral density slot 5 by a third screw 53. In this embodiment, a temperature measurement individual selects the neutral density filter 51 having a most appropriate attenuation intensity percentage according to a temperature measurement section and places the neutral density filter 51 in parallel into the neutral density filter fixing frame 52 in the neutral density slot 5. The neutral density filter 51 is, for example, an optical neutral density filter.

Figure 3:
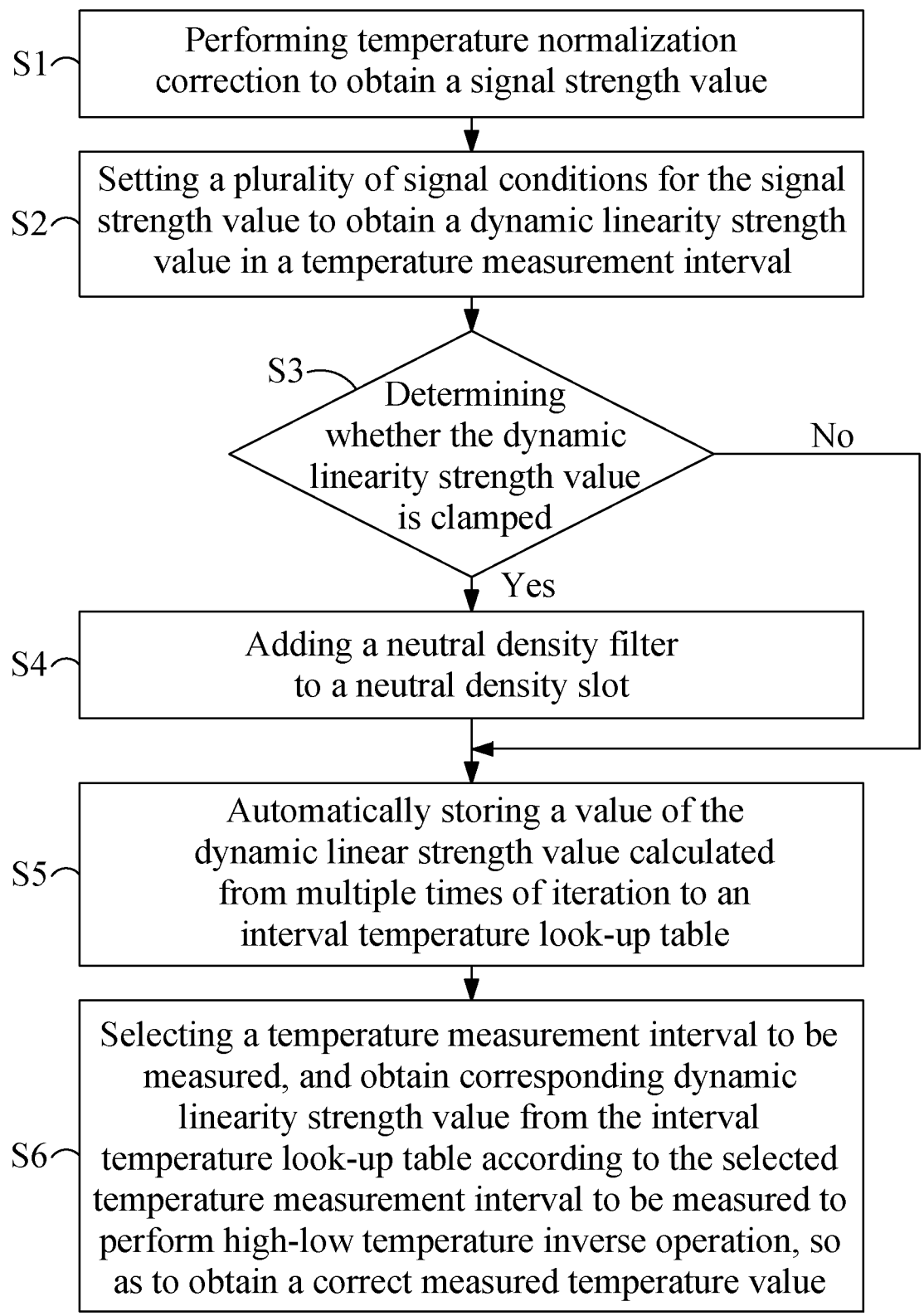
FIG. 3 is a flowchart of an accurate temperature measurement method of a wide temperature range according to an embodiment of the present disclosure.

Referring to FIG. 3 showing a flowchart of an accurate temperature measurement method of a wide temperature range of the present disclosure, the accurate temperature measurement method of a wide temperature range is performed by an accurate temperature measurement structure of a wide temperature range, and includes step S1 to S6 below.

In step S1, when the accurate temperature measurement structure of the wide temperature range is in a power-on stage, the thermal image temperature sensor of the temperature sensing unit 4 first performs a temperature normalization correction to obtain a signal strength value. More specifically, when the accurate temperature measurement structure of the wide temperature range is within a power-on interval during activation, the operating temperature of the thermal image temperature sensor increases as the operating time increases. At this point, a drifting variance occurs in the signal strength value of the target object temperature measured by the thermal image temperature sensor, and so a temperature normalization correction needs to be performed to improve such drifting variance occurring in the signal strength value. A calculation formula for the temperature normalization correction is as below:

$$T_0 = F^{-1}\left[\frac{G(T) - 42\Delta T_d}{\varepsilon} - \frac{1-\varepsilon}{\varepsilon}(0.5T_U^3 - 35.7T_U^2 + 854.1T_U - 2081.9)\right],$$

where $T_0$ is the actual temperature of an object to be measured, $F^{-1}$ is an inverse operator of a polynomial function of temperature, G(T) is a numerical strength of a temperature processed by an analog-to-digital converter (ADC) in the signal processor under a temperature to be measured, $T_d$ is an operating temperature value of the thermal image temperature sensor, $T_U$ is an ambient temperature value, and F is a surface radiation emissivity to be measured.

In step S2, the signal processor of the temperature sensing unit 4 sets a plurality of signal conditions for the signal strength value, so as to obtain a dynamic linearity strength value in a temperature measurement interval. The setting of the plurality of signal conditions performs dynamic linearity calculation of a signal gain value and a signal integration time on the signal strength value. More specifically, the signal processor selects an appropriate signal gain value and an appropriate signal integration time from a predetermined internal correction look-up table according to the signal strength value, and then performs dynamic linearity calculation on the signal gain value and the signal integration time to obtain the dynamic linearity strength value. In step S3, the signal processor determines an extreme value region according to the dynamic linearity strength value (that is, determining whether the dynamic linearity strength value is greater than the extreme value region). For example, before setting the temperature interval by a black body and performing a high-low temperature inverse operation, it is determined whether the dynamic linearity strength value is clamped (that is, whether or not saturated), wherein the extreme value region has a predetermined clamping value. When the dynamic linearity strength value is greater than the predetermined clamping value (that is, saturated, then followed by step S4), the neutral density filter 51 needs to be added to the neutral density slot 5 (step S4). At this point, the signal strength value is still maintained with a high linearity. When the dynamic linearity strength value is less than the predetermined clamping value, the neutral density filter 51 does not need to be added (that is, not saturated, so followed by step S5). In step S5, the signal processor automatically stores a value of the dynamic linearity strength value calculated from multiple times of iteration to an interval temperature look-up table, which stores multiple temperature measurement intervals to be measured and multiple dynamic linearity strength values respectively corresponding to the temperature measurement intervals to be measured. In step S6, the signal processor receives a temperature measurement interval to be measured selection signal from the temperature measurement individual to accordingly select the temperature measurement interval to be measured, and obtains the corresponding dynamic linearity strength value from the interval temperature look-up table according to the temperature measurement interval to be measured to perform a high-low temperature inverse operation, so as to obtain a correct measured temperature value. After multiple times of iteration above, the precision of the decimal point value of the dynamic linearity strength value after iteration is fixed, and the final iteration is thus completed. When the dynamic linearity strength value is greater than the predetermined clamping value, the signal processor may, by a wired or wireless means, issue an output signal to a user interface to add a neutral density filter for the temperature measurement individual to add the neutral density filter 51 to the neutral density slot 5 according to the output signal displayed on the user interface.

Figure 4:
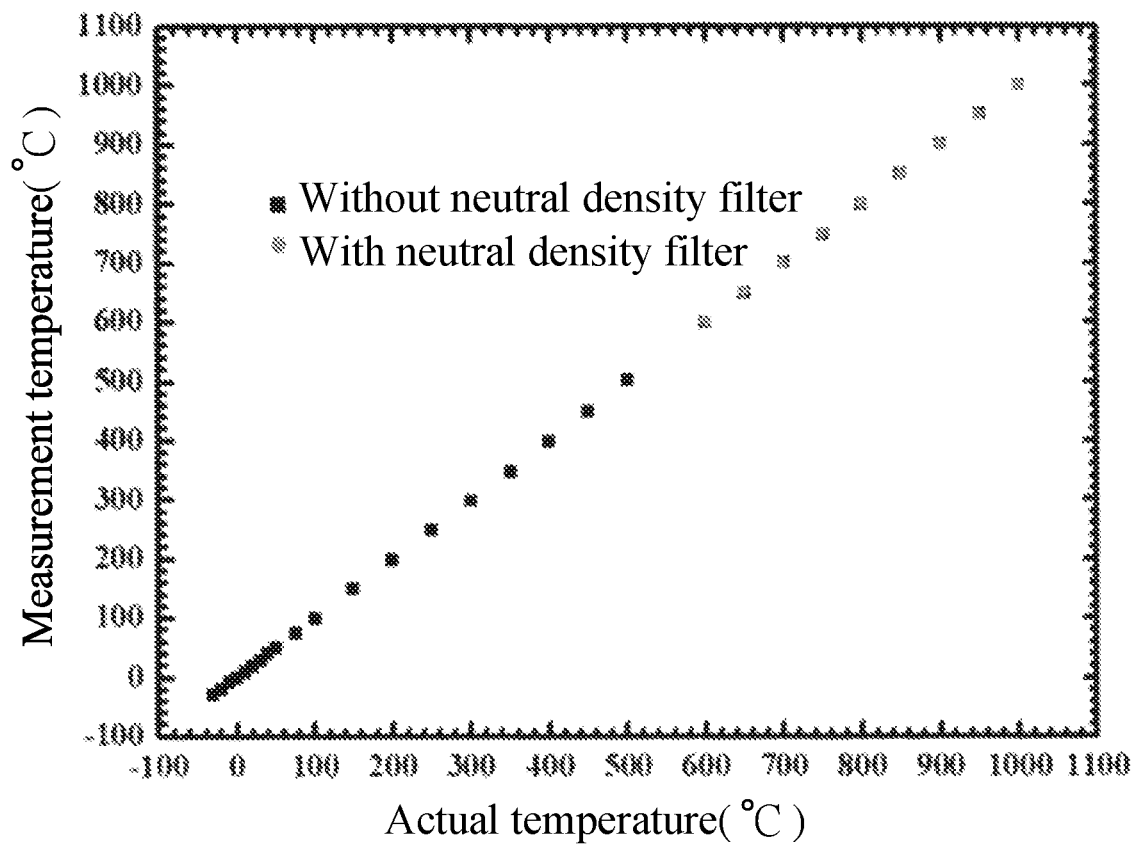
FIG. 4 is a comparison diagram of actual measured temperatures for standard black body temperatures measured by a temperature measurement structure of a wide temperature range and "with" or "without" neutral density filters of the present disclosure by using the accurate temperature measurement method of the wide temperature range of the present disclosure.

The accurate temperature measurement structure of the wide temperature range is used in combination with the flowchart above, enabling a temperature measurement device based on the disclosure to measure the accurate temperature of a target within a temperature measurement interval of a large temperature range. This measurement example is an accurate measurement of a temperature measurement experiment using a standard black body radiation source as the radiation temperature value of a target object. In this embodiment, the temperature measurement range without the neutral density filter 51 is merely −30° C. to 500° C. With appropriate signal gain value and signal integration time or bias time selected, the signal strength within the temperature measurement interval is provided with a highest linearity. Moreover, with the neutral density filter 51 added, the measurement temperature range is extended to 1000° C., and extremely high temperature linearity and accuracy can be maintained, as shown in FIG. 4. By using the accurate temperature measurement method of the wide temperature range of FIG. 3, the extreme value test temperature of an accurate temperature measurement region can even reach over 1000° C. As Table-1 below, within an extremely wide temperature measurement interval from −30° C. to 1000° C., each actual temperature interval (B.B Temp, with 10 minutes residing time in each target temperature), average temperature (AVG), standard temperature difference (TSD), minimum temperature (MIN), maximum temperature (MAX) and median temperature (MEDIAN) are quantized and compared. Except for extremely low and extremely high temperature regions (low than 0° C. and higher than 950° C.) wherein the standard temperature differences are greater than 1° C., the standard temperature differences of the rest are within 1° C. and can be as low as between 0.11° C. and 0.15° C. for middle temperature regions (around 300° C. to 500° C. in this example). It is further observed that, the median temperature in extremely high temperature regions (around 800° C. to 1000° C. in this example) is the same as the standard black body temperature. This means that in extremely high temperature regions, the temperature measurement error variance within a long-time interval (10-minute interval) is ≤1‰.

TABLE 1

| B.B Temp | AVG | STD | MIN | MAX | MEDIAN |
| --- | --- | --- | --- | --- | --- |
| 1000° C. | 999.45 | 1.02 | 996.54 | 1001.96 | 999.48 |
| 950° C. | 950.29 | 0.59 | 948.58 | 952.18 | 950.30 |
| 900° C. | 899.89 | 0.72 | 897.34 | 901.60 | 900.02 |
| 850° C. | 849.02 | 0.57 | 846.63 | 850.78 | 849.03 |
| 800° C. | 799.63 | 0.98 | 796.89 | 801.58 | 799.80 |
| 750° C. | 748.85 | 0.57 | 745.44 | 751.03 | 748.89 |
| 700° C. | 699.69 | 0.71 | 697.79 | 701.47 | 699.80 |
| 650° C. | 649.58 | 0.57 | 648.23 | 651.48 | 649.60 |
| 600° C. | 599.67 | 0.39 | 598.43 | 600.88 | 599.66 |
| 500° C. | 501.51 | 0.15 | 501.04 | 501.86 | 501.53 |
| 450° C. | 448.92 | 0.13 | 448.38 | 449.29 | 448.89 |
| 400° C. | 397.80 | 0.13 | 397.49 | 398.27 | 397.79 |
| 350° C. | 348.60 | 0.12 | 348.28 | 349.05 | 348.60 |
| 300° C. | 297.92 | 0.11 | 297.60 | 298.30 | 297.95 |
| 250° C. | 248.13 | 0.17 | 247.67 | 248.67 | 248.13 |
| 200° C. | 198.61 | 0.31 | 197.66 | 199.32 | 198.71 |
| 150° C. | 149.15 | 0.40 | 148.37 | 150.04 | 149.10 |
| 100° C. | 99.51 | 0.29 | 98.56 | 100.41 | 99.49 |
| 75° C. | 74.06 | 0.47 | 73.11 | 75.88 | 74.04 |
| 50° C. | 50.74 | 0.56 | 49.22 | 52.16 | 50.70 |
| 40° C. | 40.21 | 0.46 | 38.91 | 41.72 | 40.12 |
| 30° C. | 28.20 | 0.73 | 26.85 | 30.66 | 28.21 |
| 20° C. | 19.45 | 0.59 | 18.01 | 21.45 | 19.50 |
| 10° C. | 9.18 | 0.45 | 7.95 | 10.44 | 9.06 |
| 0° C. | 0.26 | 0.53 | −1.24 | 1.84 | 0.32 |
| −10° C. | −8.26 | 1.24 | −10.94 | −4.44 | −8.48 |
| −20° C. | −18.58 | 1.27 | −22.18 | −13.49 | −18.89 |
| −30° C. | −28.57 | 1.97 | −33.27 | −21.76 | −28.87 |

In conclusion, the present disclosure achieves the following advantages. First of all, during dynamic temperature range measurement, the temperature sensing unit 4 performs a temperature normalization correction to obtain the signal strength value, and selects the most appropriate signal gain value and signal integration time according to the signal strength value to obtain the dynamic linearity strength value, so as to maintain high temperature measurement precision. Thus, unlike the prior art in which multiple temperature measurement devices for different temperature intervals need to be purchased to measure specific temperature ranges and maintain high temperature measurement precision, costs can be saved. Meanwhile, real-time monitoring can be performed from extremely low temperatures to extremely high temperatures, unlike the prior art in which multiple temperature measurement devices for different temperature intervals are used in a way that the multiple temperature measurement devices in practice are unable to perform coaxial temperature measurement at a lens. Thus, in the prior art, the temperature measurement precision is affected by the optical axis of the system, and the temperature of a region to be measured cannot be accurately measured. Therefore, the present disclosure satisfies the needs for temperature measurement of a wide temperature interval in applications of temperature measurement and observation of a wide temperature range over an extended period of time. Secondly, by using one single accurate temperature measurement structure of a wide temperature range, no complex optical mechanisms are needed. For example, optical neutral density filters (for example, neural density (ND) filters) having different attenuation intensity percentages are replaced similarly to means of myopia glasses and placed into the optical neutral density slot 5, and the linearity of response signals under the wide temperature range can be maintained, achieving high temperature measurement precision under the wide temperature range. Thirdly, the accurate temperature measurement method of the wide temperature range of the present disclosure can be implemented according to the method shown in FIG. 3 by using currently commercially available thermal imagers, which can then obtain digital signal strength values and become temperature measurement thermal imagers applicable in a wide temperature range.

The description above provides merely preferred embodiments of the present invention, and are not to be construed as limitations to the scope of the claims of the present invention. All equivalent modifications made on the basis of the concept of the present invention without departing from the inventive spirit of the present invention are to be encompassed within the scope of the appended claims.

What is claimed is:

1. An accurate temperature measurement structure of a wide temperature range, comprising:
   a lens set, having a first connecting member;
   an optical base, having a first coupling member, a second connecting member and a neutral density slot, the neutral density slot located on a plane perpendicular to an optical axis, wherein the lens set is connected to the first coupling member of the optical base by the first connecting member, and the lens set is fixed to the optical base by a first screw;
   a mask shutter assembly, having a second coupling member, wherein the optical base is connected to the second coupling member of the mask shutter assembly by the second connecting member, and the mask shutter assembly is fixed with the optical base by a second screw; and
   a temperature sensing unit, disposed in the optical base and for sensing a target object temperature to obtain a measured temperature value, the temperature sensing unit performing a temperature normalization correction when the accurate temperature measurement structure of the wide temperature range is in a power-on stage to obtain a signal strength value, setting a plurality of signal conditions according to the signal strength value to obtain a dynamic linearity strength value, and determining an extreme value region according to the dynamic linearity strength value, wherein a neutral density filter is added to the neutral density slot when it is determined that the dynamic linearity strength value is greater than the extreme value region.

2. The accurate temperature measurement structure of the wide temperature range according to claim 1, wherein the extreme value region has a predetermined clamping value, the determining of the extreme value region determines whether the dynamic linearity strength value is greater than the predetermined clamping value, the neutral density filter is added to the neutral density slot when the dynamic linearity strength value is greater than the predetermined clamping value, and the neutral density filter is not added to the neutral density slot when the dynamic linearity strength value is less than the predetermined clamping value.

3. The accurate temperature measurement structure of the wide temperature range according to claim 1, wherein the neutral density filter is fixed in the neutral density slot by a third screw.

4. The accurate temperature measurement structure of the wide temperature range according to claim 3, wherein a neutral density filter having a most appropriate attenuation intensity percentage is selected as the neutral density filter according to a temperature measurement interval and placed in parallel into the neutral density slot.

5. The accurate temperature measurement structure of the wide temperature range according to claim 1, wherein the mask shutter assembly comprises an electrically controlled motor.

6. An accurate temperature measurement method of a wide temperature range, performed by the accurate temperature measurement structure of the wide temperature range according to claim 1, the method comprising:
   performing a temperature normalization correction when the accurate temperature measurement structure of the wide temperature range is in a power-on stage to obtain a signal strength value;
   setting a plurality of signal conditions for the signal strength value to obtain a dynamic linearity strength value;
   determining an extreme value region for the dynamic linearity strength value, adding the neutral density filter to the neutral density slot when the dynamic linearity strength value is greater than a predetermined clamping value, and not adding the neutral density filter to the neutral density slot when the dynamic linearity strength value is less than the predetermined clamping value;
   automatically storing a value of the dynamic linearity strength value calculated from a plurality of times of iteration to an interval temperature look-up table; and
   performing a high-low temperature inverse operation to obtain a measured temperature value.

7. The accurate temperature measurement method of the wide temperature range according to claim 6, wherein the setting of the plurality of signal conditions performs dynamic linearity calculation of a signal gain value and a signal integration time on the signal strength value to obtain the dynamic linearity strength value.

8. The accurate temperature measurement method of the wide temperature range according to claim 6, wherein a neutral density filter having a most appropriate attenuation intensity percentage is selected as the neutral density filter according to a temperature measurement interval and placed in parallel into the neutral density slot.

9. The accurate temperature measurement method of the wide temperature range according to claim 6, wherein the neutral density filter is fixed in the neutral density slot by a third screw.

10. The accurate temperature measurement method of the wide temperature range according to claim 6, wherein a neutral density filter having a most appropriate attenuation intensity percentage is selected as the neutral density filter according to a temperature measurement interval and placed in parallel into the neutral density slot.

* * * * *